United States Patent
Yasuda (10) Patent No.: US 8,095,784 B2
(45) Date of Patent: Jan. 10, 2012

(54) COMPUTER SYSTEM AND METHOD FOR ACTIVATING BASIC PROGRAM THEREIN

(75) Inventor: Yasunori Yasuda, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1118 days.

(21) Appl. No.: 11/909,213

(22) PCT Filed: Sep. 26, 2006

(86) PCT No.: PCT/JP2006/319047
§ 371 (c)(1),
(2), (4) Date: Oct. 18, 2007

(87) PCT Pub. No.: WO2007/049423
PCT Pub. Date: May 3, 2007

(65) Prior Publication Data
US 2009/0064145 A1    Mar. 5, 2009

(30) Foreign Application Priority Data
Oct. 24, 2005   (JP) ................... 2005-308970

(51) Int. Cl.
*G06F 9/00* (2006.01)
*G06F 15/177* (2006.01)

(52) U.S. Cl. ................. 713/2; 713/1; 713/100

(58) Field of Classification Search .............. 713/1, 2, 713/100
See application file for complete search history.

(56) References Cited

U.S. PATENT DOCUMENTS
6,711,605 B2 * 3/2004 Sekiguchi et al. ............ 718/100
(Continued)

FOREIGN PATENT DOCUMENTS
EP    1467282 A2 * 10/2004
(Continued)

OTHER PUBLICATIONS
International Search Report of International Application PCT/JP2006/319047.
(Continued)

*Primary Examiner* — Thomas Lee
*Assistant Examiner* — Jaweed A Abbaszadeh
(74) *Attorney, Agent, or Firm* — Matthew B. Dernier, Esq.; Gibson & Dernier, LLP (57) ABSTRACT

A computer system capable of executing a basic program for providing a program execution environment. The system has a storage device for storing data that is necessary to the basic program during startup, and, for each basic program, configuration data that indicates information relating to data necessary during startup. In the computer system, data relating to the basic program that is to be started is read from the storage device setting, data necessary during startup is acquired from the storage device on the basis of information written in the configuration data, the data necessary during startup is stored in memory space that is in the memory device and that can be accessed from the basic program that is to be started, and a process for starting the designated basic program is executed.

6 Claims, 5 Drawing Sheets

U.S. PATENT DOCUMENTS

| | | | |
|---|---|---|---|
| 7,409,536 B2 * | 8/2008 | Guo et al. .......................... | 713/1 |
| 7,434,224 B2 * | 10/2008 | Lescouet et al. .............. | 718/108 |
| 7,516,319 B2 * | 4/2009 | Chen ................................ | 713/2 |
| 7,590,877 B2 * | 9/2009 | Kim et al. ..................... | 713/323 |
| 2003/0074550 A1 * | 4/2003 | Wilks et al. ....................... | 713/2 |
| 2004/0098575 A1 * | 5/2004 | Datta et al. ........................ | 713/2 |
| 2004/0205755 A1 * | 10/2004 | Lescouet et al. .............. | 718/100 |
| 2005/0182922 A1 * | 8/2005 | Guo et al. .......................... | 713/1 |
| 2005/0216722 A1 * | 9/2005 | Kim et al. ......................... | 713/2 |
| 2005/0283597 A1 * | 12/2005 | Holzmann ........................ | 713/2 |
| 2006/0101259 A1 * | 5/2006 | Chen ................................. | 713/2 |
| 2008/0155542 A1 * | 6/2008 | Maigne et al. ................. | 718/100 |
| 2009/0064145 A1 * | 3/2009 | Yasuda .......................... | 718/100 |

FOREIGN PATENT DOCUMENTS

| | | | |
|---|---|---|---|
| JP | 2309437 A | | 12/1990 |
| JP | 06324849 | | 11/1994 |
| JP | 2003330724 A | | 11/2003 |
| WO | WO 2004090719 A2 | * | 10/2004 |
| WO | WO 2005031572 A2 | * | 4/2005 |

OTHER PUBLICATIONS

Office Action for corresponding Chinese Application No. 200680002664.5, Mar. 8, 2011.

Office Action for corresponding Chinese Application No. 200680002664.5, May 15, 2010.

Office Action for corresponding Japanese Application No. 2005-308970, Jul. 6, 2010.

Office Action for corresponding European Application No. 06810572.5, Jun. 16, 2010.

International Search Report for corresponding European Patent Application EP06810572 dated: Dec. 11, 2008.

Matzigekeit G., et al., "Grub Manual Passage" Grub Manual, pp. 11-13 (Nov. 29, 2002).

Padraig Brady; "Details of GRUB on the PC" pp. 1-3, www.pixelbeat.org/docs/disk/ (Jul. 28, 2005).

Chinese Office Action for corresponding Chinese Patent Application No. 200680002664.5, Jun. 22, 2011.

* cited by examiner

| INITIAL READING DATA | STORAGE LOCATION |
|---|---|
| aaaa | cccc |
| bbbb | dddd |
| ⋮ | ⋮ |

FIG.6

COMPUTER SYSTEM AND METHOD FOR ACTIVATING BASIC PROGRAM THEREIN

TECHNICAL FIELD

The present invention relates to a computer system capable of executing a plurality of basic programs, and to a method for executing a basic program of the computer system.

BACKGROUND ART

Recent computer systems have been developed in which a plurality of program execution elements such as CPUs (central processing unit) are provided in order to improve processing speed. Such computer systems that are provided with a plurality of program execution elements have a plurality of distinct basic programs (operating system) and can, in principle, be executed by the program execution elements.

However, when a plurality of distinct basic programs are executed, access to hardware resources (i.e., disk devices, display devices) of the computer system becomes difficult to control, and processes for stably operating the system become complicated.

Therefore, taking advantage of basic programs in which so-called I/O system has been removed, and sharing a single I/O system among the basic programs, it is possible to prohibit direct access from each basic program to the hardware resources. In this case, the access to the hardware resources can be controlled in the I/O system only.

DISCLOSURE OF THE INVENTION

Problems the Invention is Intended to Solve

However, when I/O systems are removed from the basic programs, a problem will occur in that data necessary while a basic program is starting cannot be read into the memory from a disk device or the like.

In so-called microkernel technology, wherein a program for controlling access to the hardware resources is installed as a subsystem separate from a basic program main body, and a necessary minimum function is installed as the basic program main body, a technique exists in which data that becomes necessary once a basic program has started is managed by a basic program loader (for example, see Japanese Laid-open Patent Application No. 6-324849).

However, in this technique, a boot volume is provided to memory, and program data to be started when the system starts up is read by the basic program kernel. In other words, a boot loader for reading program data must be prepared for each basic program. In addition, a boot volume must be provided to memory, and a considerable amount of memory is used during a boot.

Thus, conventional microkernel methods for starting a basic program are not effective in terms of implementation and processing when used to start a plurality of distinct basic programs.

Means for Solving these Problems

The present invention was devised in view of the foregoing circumstances, and it is an object of the present invention to provide a computer system capable of simply and effectively starting a basic program that does not have an I/O system.

The present invention provides system capable of executing a basic program for providing a program execution environment, the system comprising a storage device for storing data that is necessary to the basic program during startup and configuration data that indicates information relating to data necessary during startup for each basic program; a resource manager for controlling requests for access to hardware resources that include the storage device; a memory device capable of set up memory space for each of the basic programs, and each memory space can be accessed from at least one of the basic programs; and a startup assistant for reading from the storage device configuration data that relates to the basic program that is to be started, acquiring from the storage device data that is necessary during startup on the basis of information written in the configuration data, storing the data that is necessary during startup in memory space in the memory device that can be accessed from the basic program that is to be started, and executing a process for starting the designated basic program.

BEST MODE FOR CARRYING OUT THE INVENTION

Figure 1:
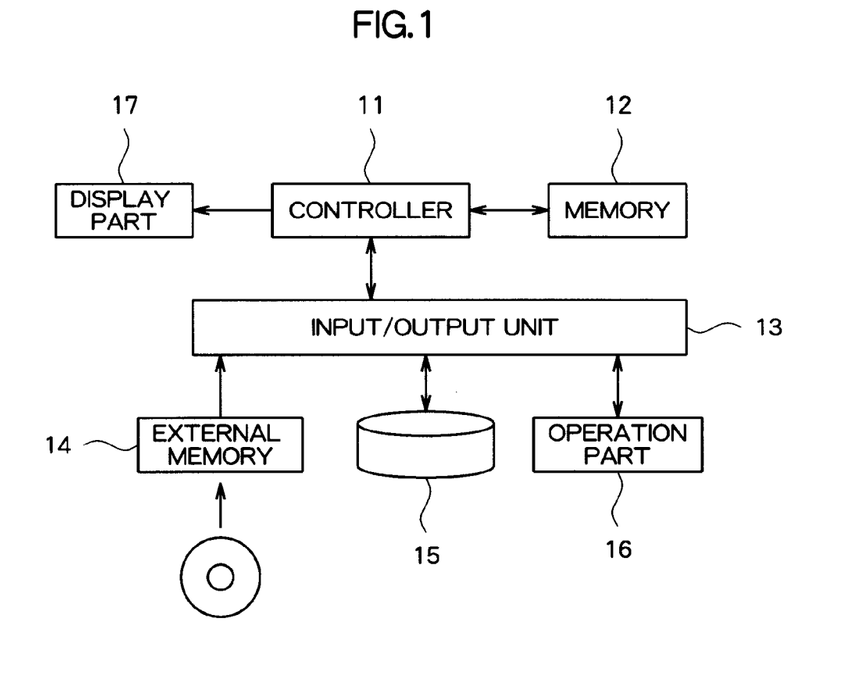
FIG. 1 is a schematic block diagram showing an example of a computer system according to an embodiment of the present invention.

An embodiment of the present invention shall be described with reference to the drawings. A computer system according to the embodiment of the present invention comprises a controller 11, a memory unit 12, an input/output unit 13, an external memory unit 14, a storage unit 15, an operation unit 16, and a display unit 17, as shown in FIG. 1.

The controller 11, such as a processor, reads out programs from an external memory medium, stores in the external memory unit 14, and executes the programs stored in the memory unit 12. The controller 11 of the present embodiment comprises a plurality of program execution elements, and therefore a plurality of basic programs can be concurrently executed. The controller 11 reads the basic programs and executes a loader program for starting a program. The operation of the controller 11 shall be described in detail below.

The memory unit 12 is a memory device comprising RAM (random access memory) and other memory elements, and holds a program that is executed by the controller 11. The program may be provided on a DVD-ROM or other computer readable recording medium. The memory unit 12 also functions as a work memory for holding data necessary when the controller 11 performs an operation.

The input/output unit 13 is a so-called bridge chip and is connected to the controller 11, external memory unit 14, storage unit 15, and operation unit 16. The input/output unit 13 selects, in accordance with instructions input from the controller 11, an output address for a signal (output signal) output from the controller 11, and selectively outputs the output signal from the controller 11 to the selected output address. The input/output unit 13 also outputs a signal to the controller 11 input from the external memory unit 14, storage unit 15, and operation unit 16.

The external memory unit 14 reads recorded information from a Blu-ray Disc, DVD, or other external recording medium, and outputs the recorded information to the controller 11 via the input/output unit 13. The storage unit 15 is a hard disk or the like, and stores programs executed by the controller 11, data used by the controller 11, or the like. In the present embodiment, configuration data for each basic program is stored on the storage unit 15. The configuration data shall be described in detail below. The external memory unit 14 and storage unit 15 correspond to examples of the storage device of the present invention.

The operation unit 16 is a game controller, a mouse, a keyboard, or the like that is operated by a user and then outputs information related to the operation to the controller 11.

The display unit 17 is a graphics-processing board or the like that creates an image in accordance with instructions input from the controller 11, outputs information relating to the resulting image to an externally connected display (e.g., a home television device), and displays the image.

The operation of the loader program of the controller 11 shall next be described. In the controller 11, a device driver (including a network driver) that corresponds to an I/O system, a program for performing processes relating to a file system, a stack (LIFO) or pipe (FIFO) for transferring data relating to network communication and other types of data, and other programs for performing maintenance; and the like have already been executed.

The basic program receives, from the loader program, a request to indicate the location of initial reading data that is necessary when the basic program is started up, and outputs data indicating the location of the data to the loader program in accordance with the request. Processor-communication processing is implemented in the basic program so that communication will be performed with other processors.

As receiving instructions from the user, the controller 11 reads the loader program, and starts to execute the loader program. The controller 11 that executes the loader program operates as a type of loader process. In the present embodiment, the loader process communicates with an I/O system process (I/O process) and reads data from the external memory unit 14, storage unit 15, and the like. The I/O process corresponds to the resource manager for controlling requests for access to hardware resources.

Figure 2:
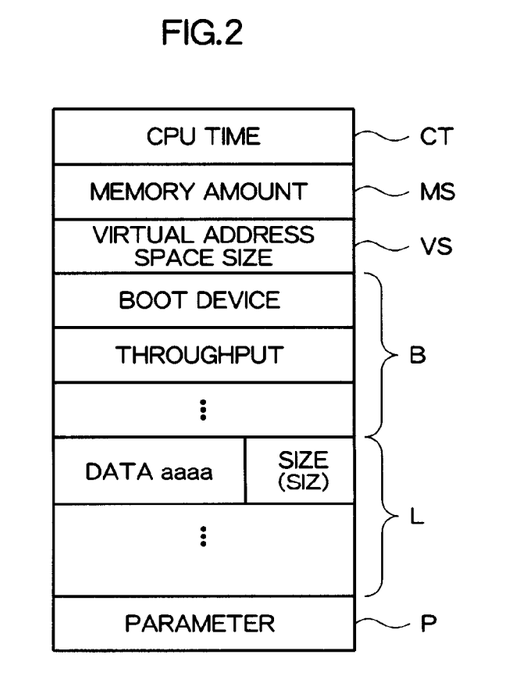
FIG. 2 is a descriptive view showing an example of the content of configuration data according to the embodiment of the present invention.

The loader process requests to the I/O process to read configuration data stored in the storage unit 15 in association with the basic program that is to be started. The configuration data relates to information for identifying the basic program (ID), and contains information relating to resources of an execution environment that includes CPU time CT; amount of used memory MS; size of virtual address space VS; and information B relating to a boot device (information specifying a boot device, as well as the throughput, delay, cache size information and other information relating to the boot device), as shown in FIG. 2. The configuration data further includes, as information involved in starting the basic program, a data specification list L for specifying data to be read to memory during startup (referred to below as "initial reading data"; the data specification list L also includes information on the size of each type of data (SIZ)), and startup kernel parameters P (run level settings and the like).

The information for specifying a boot device is information for identifying a device that causes the basic program to be read, and identifies, for example, either the external memory unit 14 or the storage unit 15. Signature information and other authentication information may be added to a configuration data in advance, and, using the authentication information, the loader process may verify whether the configuration data is valid or not. When it is determined that the data is not valid (verification fails), the process for starting the basic program is canceled.

Figure 3:
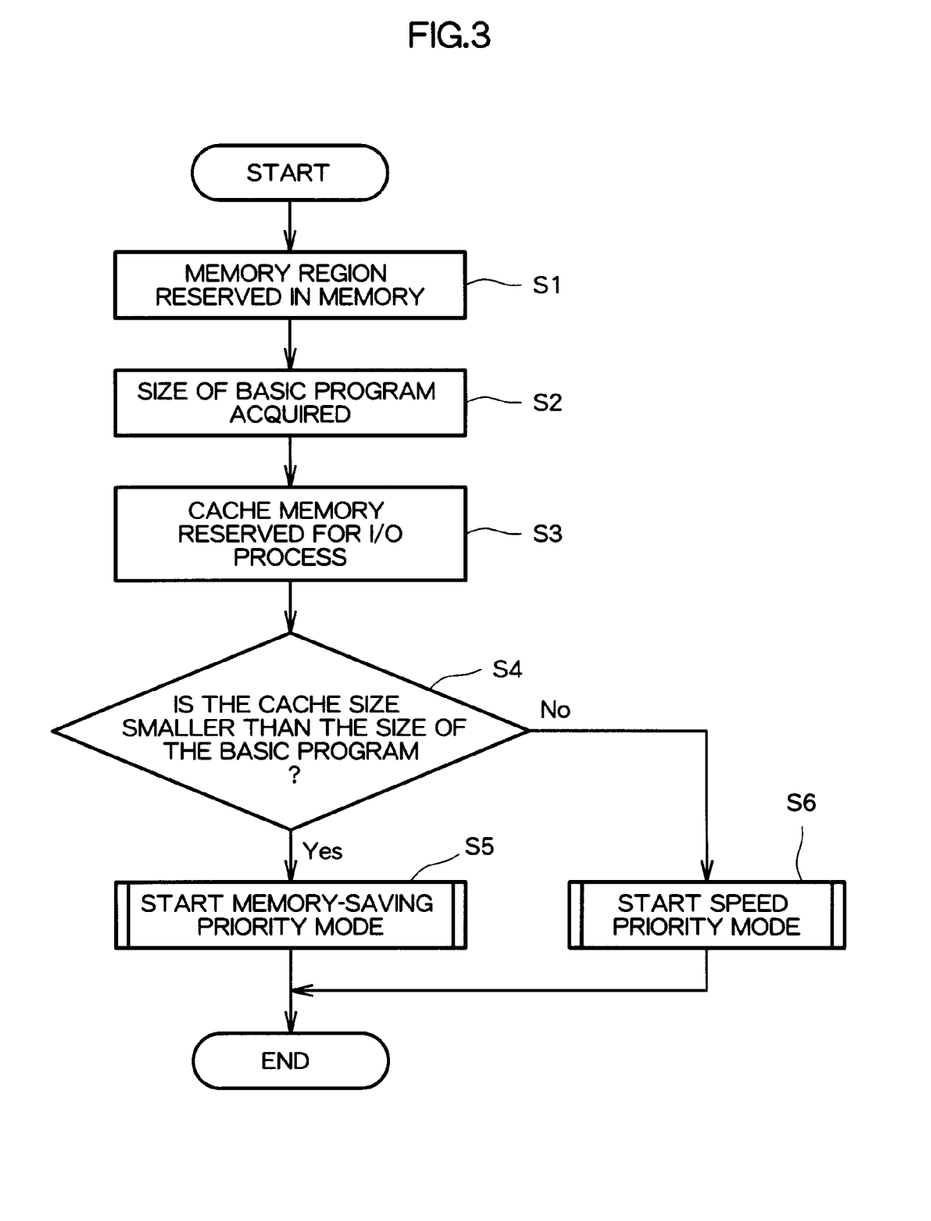
FIG. 3 is a flowchart showing an example of a process for starting a basic program according to the embodiment of the present invention.

The loader process further performs a process shown in FIG. 3. In other words, while making reference to the information relating to the amount of used memory MS, the loader process reserves a memory region within the memory unit 12 (S1). The loader process then acquires information relating to the size of the basic program (S2). The loader process reserves cache memory in the memory unit 12 for the I/O system (S3). It is then determined whether the size of the cache memory is smaller than the size of the basic program acquired in step S2 (S4). When the cache size is indicated in the boot device related information within the configuration data, the specified amount of cache memory may be reserved, and, in step S4, a decision is made as to whether the indicated size is smaller than the size of the basic program acquired in step S2.

Then, as a step in the loader process, the controller 11 starts the startup process in a memory-saving priority mode (S5) when the size of the cache memory is less than the size of the basic program. When the size of the cache memory in step S4 is not less than the size of the basic program, the startup process is started in a speed priority mode (S6).

The startup process in the memory-saving priority mode (step S5) and the startup process in the speed priority mode (step S6) shall both be described below.

Figure 4:
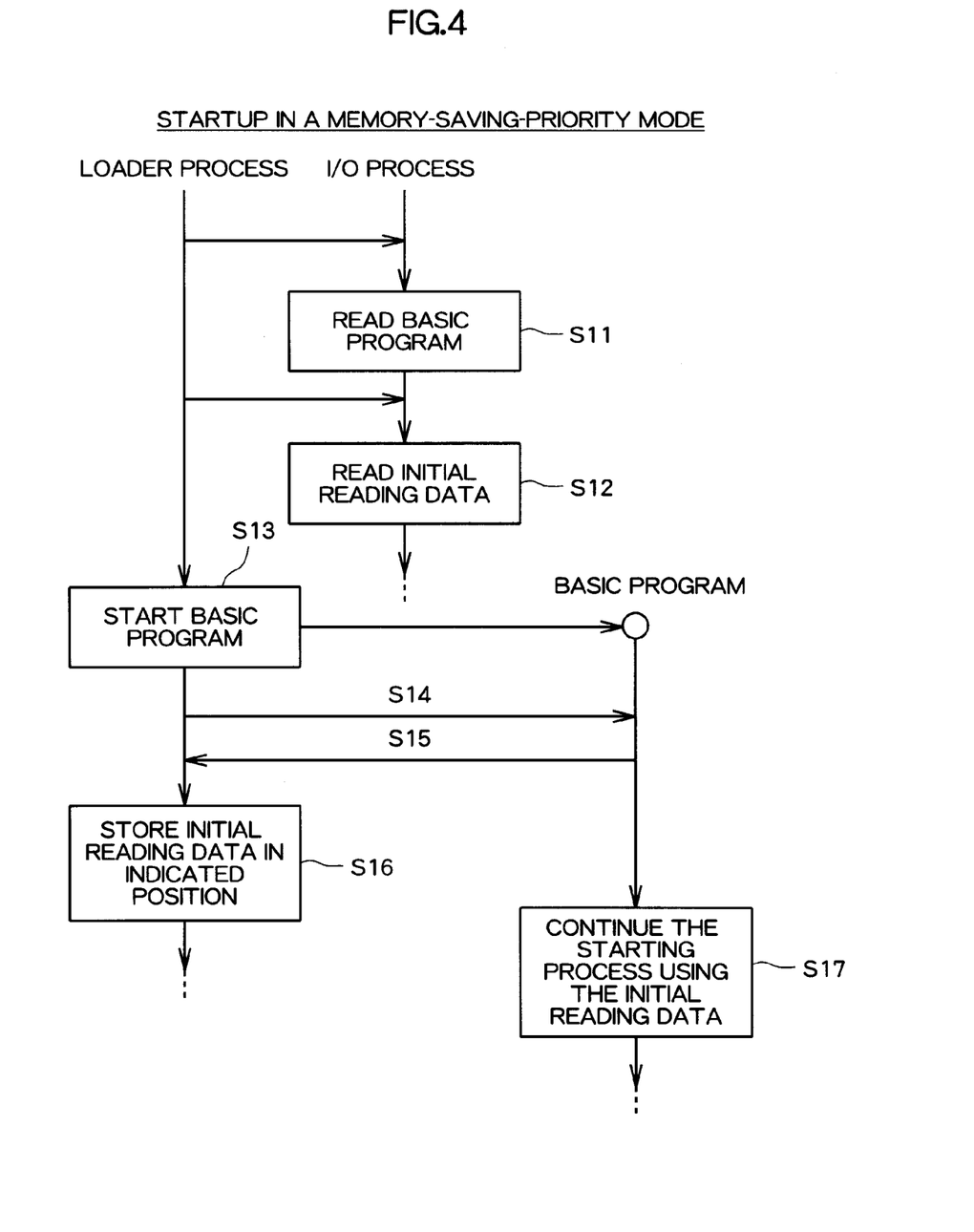
FIG. 4 is a flowchart showing an example of a starting process in a memory-saving priority mode for a basic program according to the embodiment of the present invention.

First, the startup process in the memory-saving priority mode shall be described with reference to FIG. 4. In the memory-saving priority mode, the loader process instructs the I/O process to read the basic program from the boot device specified by the configuration data, and the I/O process reads the basic program from the boot device (S11). The loader process stores the basic program read by the I/O process in the memory region reserved in the memory unit 12 (S11). While making reference to the data specification list L, the loader process then instructs the I/O process to read the initial reading data included in the list from the boot device, and the I/O process reads the initial reading data from the boot device (S12). The loader process starts to execute the basic program, and the basic program starts up (S13). When the basic program starts up, the loader process as a process of the loader program causes a request to specify the location of the initial reading data to be output to the basic program (S14).

Figure 5:
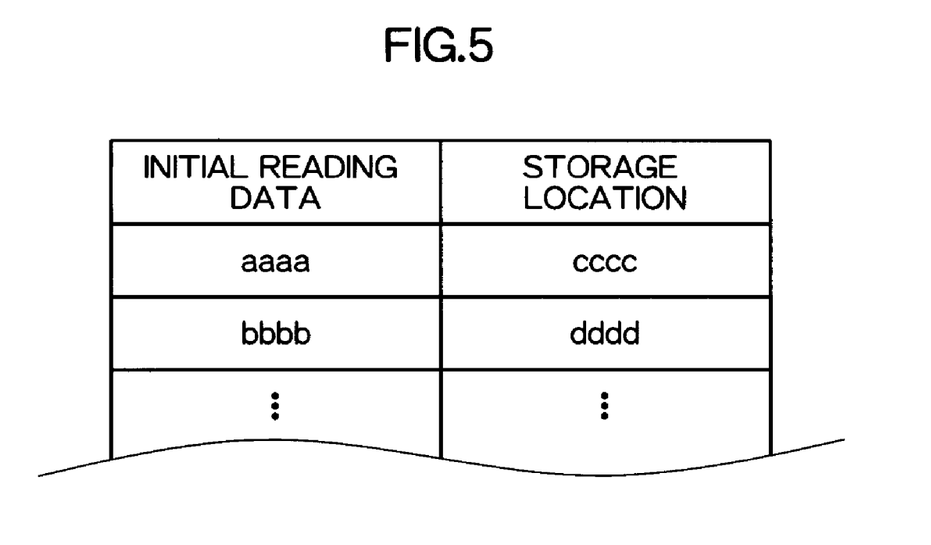
FIG. 5 is a descriptive view showing an example of data indicating a location of initial reading data according to the embodiment of the present invention.

Information relating to the location of the initial reading data is output in the basic program in response to this request (S15). The loader process receives the information relating to the location of the initial reading data from the basic program. This location information is associated with information specifying each type of initial reading data, and indicates a value for a heading address on the memory for the location, as shown in FIG. 5.

The loader process stores the initial reading data read in step S12 at the indicated location of the memory region in the memory unit 12 (S16). The basic program then continues the startup process using the initial reading data in this memory region (S17). Examples of initial starting data for UNIX (trademark) include program data ("init" and the like) and configuration data ("rc" and the like) of the process that is to be initially started.

Figure 6:
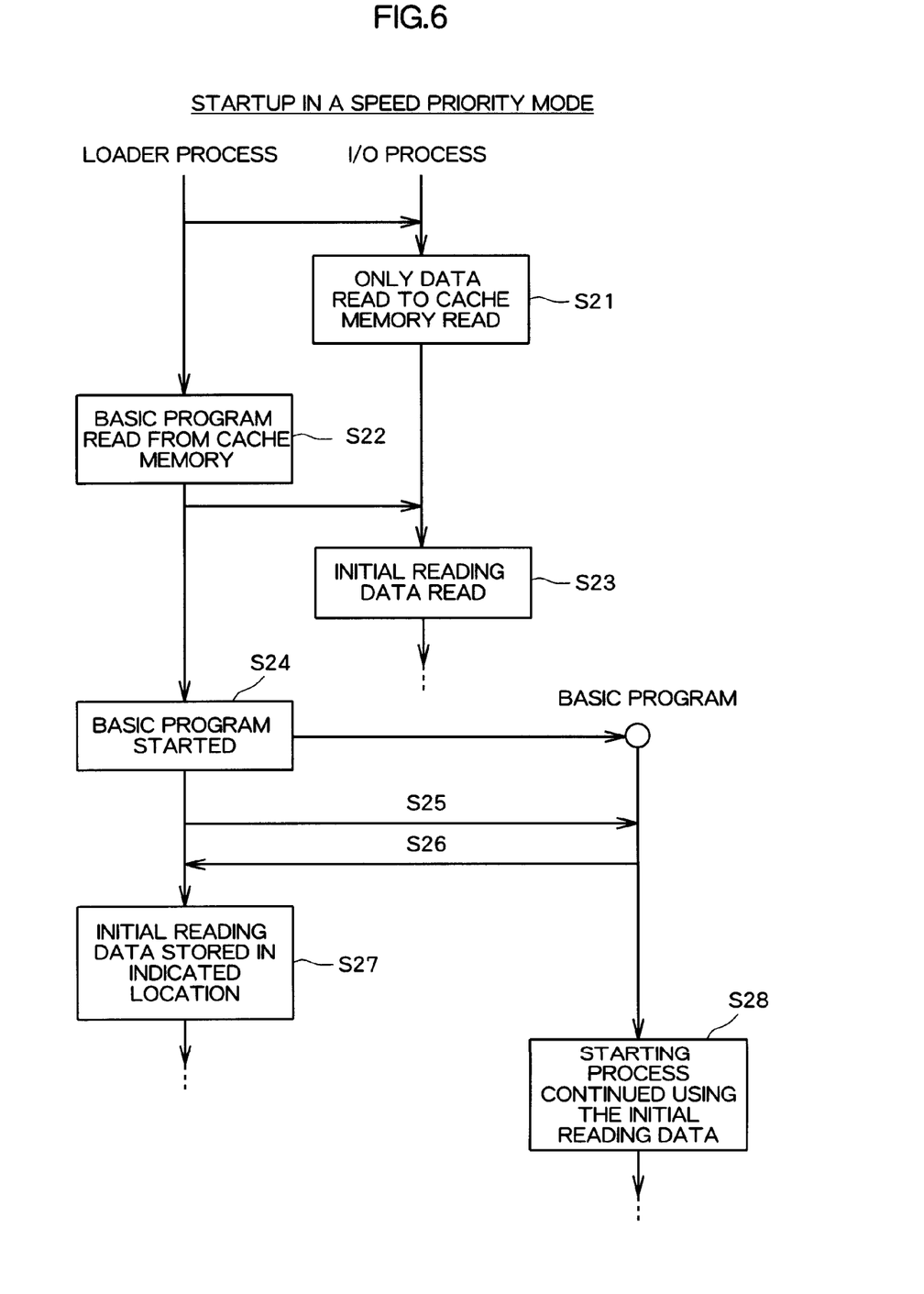
FIG. 6 is a flowchart showing an example of a starting process in a speed-priority mode for a basic program according to the embodiment of the present invention.

A startup process in the speed priority mode shall next be described. In the speed priority mode, the loader process instructs the I/O process to copy and read, from the heading block of the boot device specified by the configuration data, as much as possible amount of the data read to the cache memory reserved in the memory unit 12, as shown in FIG. 6. In accordance with these instructions, the I/O process copies from the heading block of the boot device as much as possible amount of the data read to the cache memory (S21).

The loader process then starts the process for reading the basic program. Because the data of the basic program has been read to the cache memory, the basic program in the cache memory is stored in the memory region reserved in the memory unit 12 in step S1 (S22). The I/O process and loader process can be executed concurrently, and the I/O process need not necessarily be finished reading the basic program at the stage where the loader process starts the process for reading the basic program.

While making reference to the data specification list L, the loader process instructs the I/O process to read from the boot device the initial reading data included in the list, and the I/O process reads the initial reading data from the boot device (S23). Even when the initial reading data is read, at least some may have been loaded in advance into the cache memory, and reading time can be reduced.

The loader process then starts the basic program (S24). When the basic program starts, the loader process outputs a request to the basic program to specify the location of the initial reading data (S25). The basic program then outputs information relating to the location of the initial reading data (S26).

The loader process receives from the basic program the information relating to the location of the initial reading data. This information relating to the location is the same as that in the memory-saving priority mode shown in FIG. 5. The loader process stores the initial reading data that was read in step S23 at the indicated location of the memory region in the memory unit 12 (S27). The basic program then continues the startup process using the initial reading data in this memory region (S28).

In the present embodiment, the data reading units are switched in response to the size of the reserved cache memory so that either the data is read individually in the memory-saving priority mode or the data is read all at once in the speed priority mode (that is, as much as possible amount of data written in advance to cache memory).

In the present embodiment, the processes of the loader process and I/O process in steps S11, 22 that are related to reading the basic program, and the processes in steps S12, 24 that are related to reading the initial reading data are each executed in different threads. The basic program and the initial reading data may be read asynchronously.

The process for reading the initial reading data and the process for starting the basic program (step S13 and step S25) may be executed asynchronously in separate threads.

According to the present embodiment, the initial reading data can thus be written to the memory region that can be accessed by the basic program being started, and a process for starting the basic program can be executed using the initial reading data. Thus, in the present embodiment, a basic program not having an I/O system can thereby simply and effectively be started.

The configuration data may be stored along with the basic program in an external memory medium that is read by the external memory unit 14. In this instance, the controller 11 detects that the external memory medium has been placed into the external memory unit 14, starts to execute the loader program, and starts the loader process. The loader process then reserves cache memory for the I/O process, starts the process in the speed priority mode when the size of the reserved cache memory is greater than a predetermined threshold value, and copies and reads to the I/O process as much as possible amount of the data that was read to the cache memory from the heading block of the external memory medium. In the processes shown in FIGS. 4 and 6, a description was given in which the configuration data was read in advance before the basic program was started. However, the configuration data may be read after the start of the process for starting the basic program. In this instance, the initial reading data indicated by the configuration data is read after the start of the process for starting the basic program.

The loader process then reads the configuration data and basic program data from the cache memory and reserves a memory region in the memory unit 12 on the basis of the configuration data. The loader process stores the basic program in the memory region reserved in the memory unit 12, and, while making reference to the data specification list L included in the read configuration data, reads the initial reading data included in the list to the I/O process.

The loader process then starts the basic program and requests information relating to the location of the initial reading data. The loader process receives the information relating to the location of the initial reading data from the basic program and stores the initial reading data at the specified location of the memory region in the memory unit 12.

On the other hand, when the size of the reserved cache memory is less than the predetermined threshold value, in the memory-saving priority mode, the configuration data is read to the I/O system, and a memory region is reserved in the memory unit 12 on the basis of the configuration data. The loader process then reads the basic program data to the I/O system, and the basic program data is stored in the reserved memory region.

The loader process then starts the basic program and requests information relating to the location of the initial reading data. The loader process receives the information relating to the location of the initial reading data from the basic program, reads the initial reading data to the I/O system, and stores the data at the specified location of the memory region in the memory unit 12.

In the above description, the selection of either the memory-saving priority mode or the speed economy mode as the reading method to be used to perform startup was made on the basis of the size of the reserved memory. However, the selection may alternatively be made on the basis of the throughput or delay of the boot device of the basic program or other information relating to speed (may be written in the configuration data as information relating to the boot device). For example, a configuration may be used in which, when the throughput of the boot device is less than a predetermined threshold value (when the speed is low) and when cache memory having sufficient size to read a plurality of sets of initial reading data in a single cycle can be reserved, the startup is performed in the speed priority mode. Furthermore, when the throughput of the boot device is greater than or equal to the predetermined threshold value (when the speed is high) or when cache memory having sufficient size to read a plurality of sets of initial reading data in a single cycle cannot be reserved even at a low speed, the startup is performed in the memory-saving priority mode.

The invention claimed is:

1. A computer system capable of executing one or more basic programs for providing a program execution environment, comprising:

a storage device for storing, for each basic program, data that is necessary to the one or more basic programs during startup, and, configuration data that indicates information relating to data necessary during startup;

a resource manager for controlling requests for access to hardware resources that include the storage device;

a memory device capable of setting memory space for each of the basic programs, and each memory space can be accessed from at least one of the basic programs; and a startup assistant for reading from the storage device configuration data that relates to the basic programs, acquiring from the storage device data that is necessary during startup of a designated one of the basic programs that is to be started on the basis of information written in the configuration data, storing the data that is necessary during startup in a memory space in the memory device that can be accessed from the designated basic program that is to be started, and executing a process for starting the designated basic program, wherein the startup assistant: (i) outputs a request to specify a location of the data necessary during startup to the designated basic program via communication between the designated basic program and the startup assistant, (ii) receives from the designated basic program an indication of the location of data necessary during startup via the communication between the designated basic program and the startup assistant, and (iii) in accordance with the indication, stores data acquired from the storage device in the memory device when the process for starting the designated basic program is executed.

2. A computer system capable of executing one or more basic programs for providing a program execution environment, comprising:

a storage device for storing, for each basic program, data that is necessary to the one or more basic programs during startup, and, configuration data that indicates information relating to data necessary during startup;

a resource manager for controlling requests for access to hardware resources that include the storage device;

a memory device capable of setting memory space for each of the basic programs, and each memory space can be accessed from at least one of the basic programs;

a startup assistant for reading from the storage device configuration data that relates to the basic programs, acquiring from the storage device data that is necessary during startup of a designated one of the basic programs on the basis of information written in the configuration data, storing the data that is necessary during startup in a memory space in the memory device that can be accessed from the designated basic program that is to be started, and executing a process for starting the designated basic program; and a reader for reading from a boot device the designated basic program that is to be started; wherein the reader for reading the designated basic program from the boot device selectively reads the designated basic program using either a speed priority mode in which the designated basic program is read to a cache memory and then stored on the memory device from the cache memory, or a memory-saving mode in which the designated basic program is stored in the memory device without being read to the cache memory.

3. A method for starting one or more basic programs that cannot directly access hardware resources, using a computer system comprising:

a storage device for storing, for each basic program, data that is necessary to the one or more basic programs during startup, and configuration data that indicates information relating to data necessary during startup;

a resource manager for controlling requests for access to hardware resources that include the storage device; and a memory device capable of setting memory space for each of the basic programs, and each memory space can be accessed from at least one of the basic programs;

wherein the method comprises the steps of:

reading from the storage device configuration data relating to a designated one of the basic programs that is to be started;

acquiring from the storage device data necessary during startup on the basis of information written in the configuration data;

storing the data necessary during startup in memory space that is in the memory device and can be accessed from the designated basic program that is to be started;

executing a process for starting the designated basic program; and selectively reading from a boot device the designated basic program that is to be started using either: (i) a speed priority mode in which the designated basic program is read to a cache memory and then stored on the memory device from the cache memory, or (ii) a memory-saving mode in which the designated basic program is stored in the memory device without being read to the cache memory.

4. A non-transitory, computer readable recording medium containing a loader program for starting one or more basic programs that cannot directly access hardware resources, the loader program for execution by a computer system, comprising:

a storage device for storing, for each basic program, data that is necessary to the one or more basic programs during startup and configuration data that indicates information relating to data necessary during startup;

a resource manager for controlling requests for access to hardware resources that include the storage device; and a memory device capable of setting memory spaces for each basic programs, and each memory space can be accessed from at least one of the basic programs;

wherein the loader program causes the computer to: (i) read from the storage device configuration data relating to a designated one of the basic program that is to be started, (ii) acquire from the storage device data necessary during startup on the basis of information written in the configuration data, (iii) store the data necessary during startup in memory space that is in the memory device and can be accessed from the designated basic program that is to be started, (iv) execute a process for starting the designated basic program, and (v) selectively read from a boot device the designated basic program that is to be started using either: a speed priority mode in which the designated basic program is read to a cache memory and then stored on the memory device from the cache memory; or a memory-saving mode in which the designated basic program is stored in the memory device without being read to the cache memory.

5. A method for starting one or more basic programs that cannot directly access hardware resources, using a computer system comprising:

a storage device for storing, for each basic program, data that is necessary to the one or more basic programs during startup, and configuration data that indicates information relating to data necessary during startup;

a resource manager for controlling requests for access to hardware resources that include the storage device; and a memory device capable of setting memory space for each of the basic programs, and each memory space can be accessed from at least one of the basic programs, wherein the method comprises the steps of:

storing, for each basic program, data that is necessary to the one or more basic programs during startup, and, configuration data that indicates information relating to data necessary during startup, and via a loader program:

controlling requests for access to hardware resources that include the storage device;

setting memory space for each of the basic programs such that each memory space can be accessed from at least one of the basic programs;

reading from the storage device configuration data that relates to the basic programs;

acquiring from the storage device data that is necessary during startup of a designated one of the basic programs that is to be started on the basis of information written in the configuration data;

storing the data that is necessary during startup in a memory space in the memory device that can be accessed from the designated basic program that is to be started;

executing a process for starting the designated basic program;

outputting a request to specify a location of the data necessary during startup to the designated basic program via communication between the designated basic program and the loader program;

receiving from the designated basic program an indication of the location of data necessary during startup via the communication between the designated basic program and the loader program; and storing, in accordance with the indication, data acquired from the storage device in the memory device when the process for starting the designated basic program is executed.

6. A non-transitory, computer readable recording medium containing a loader program for starting one or more basic programs that cannot directly access hardware resources, the loader program for execution by a computer system, comprising:

a storage device for storing, for each basic program, data that is necessary to the one or more basic programs during startup and configuration data that indicates information relating to data necessary during startup;

a resource manager for controlling requests for access to hardware resources that include the storage device; and a memory device capable of setting memory spaces for each basic programs, and each memory space can be accessed from at least one of the basic programs;

wherein the loader program causes the computer to:

store, for each basic program, data that is necessary to the one or more basic programs during startup, and, configuration data that indicates information relating to data necessary during startup;

control requests for access to hardware resources that include the storage device;

set memory space for each of the basic programs such that each memory space can be accessed from at least one of the basic programs;

read from the storage device configuration data that relates to the basic programs;

acquire from the storage device data that is necessary during startup of a designated one of the basic programs that is to be started on the basis of information written in the configuration data;

store the data that is necessary during startup in a memory space in the memory device that can be accessed from the designated basic program that is to be started;

execute a process for starting the designated basic program;

output a request to specify a location of the data necessary during startup to the designated basic program via communication between the designated basic program and the loader program;

receive from the designated basic program an indication of the location of data necessary during startup via the communication between the designated basic program and the loader program; and store, in accordance with the indication, data acquired from the storage device in the memory device when the process for starting the designated basic program is executed.

* * * * *